United States Patent [19]

Bell, Jr. et al.

[11] 4,267,422

[45] May 12, 1981

[54] POWER SUPPLY CIRCUIT OF THE HIGH VOLTAGE TYPE FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 26,049

[22] Filed: Apr. 2, 1979

[51] Int. Cl.³ ............................................. B23P 1/02
[52] U.S. Cl. ................................ 219/69 C; 219/69 P
[58] Field of Search .................. 219/69 C, 69 P, 69 S; 250/551, 552

[56] References Cited

U.S. PATENT DOCUMENTS

| | | | |
|---|---|---|---|
| 3,524,037 | 8/1970 | Sennowitz | 219/69 S |
| 3,843,864 | 10/1974 | Wohlabaugh | 219/69 C |
| 3,987,271 | 10/1976 | Bell, Jr. et al. | 219/69 C |
| 4,063,121 | 12/1977 | Bartlett | 250/551 |

OTHER PUBLICATIONS

S. Ciarcia, "No Power For Your Interfaces", *Byte*, 10/1978, pp. 22-31.

*Primary Examiner*—C. C. Shaw
*Attorney, Agent, or Firm*—Harry R. Dumont

[57] ABSTRACT

An improved high voltage module for use in conjunction with a standard power module. The high voltage module includes a floating power supply in parallel with the standard power module and without ground connection included in the high voltage module are a plurality of stages of Darlington amplifiers. The two modules are opticoupled in the circuit with provision for fast turn-on and turn-off networks for the opticoupling network.

5 Claims, 1 Drawing Figure

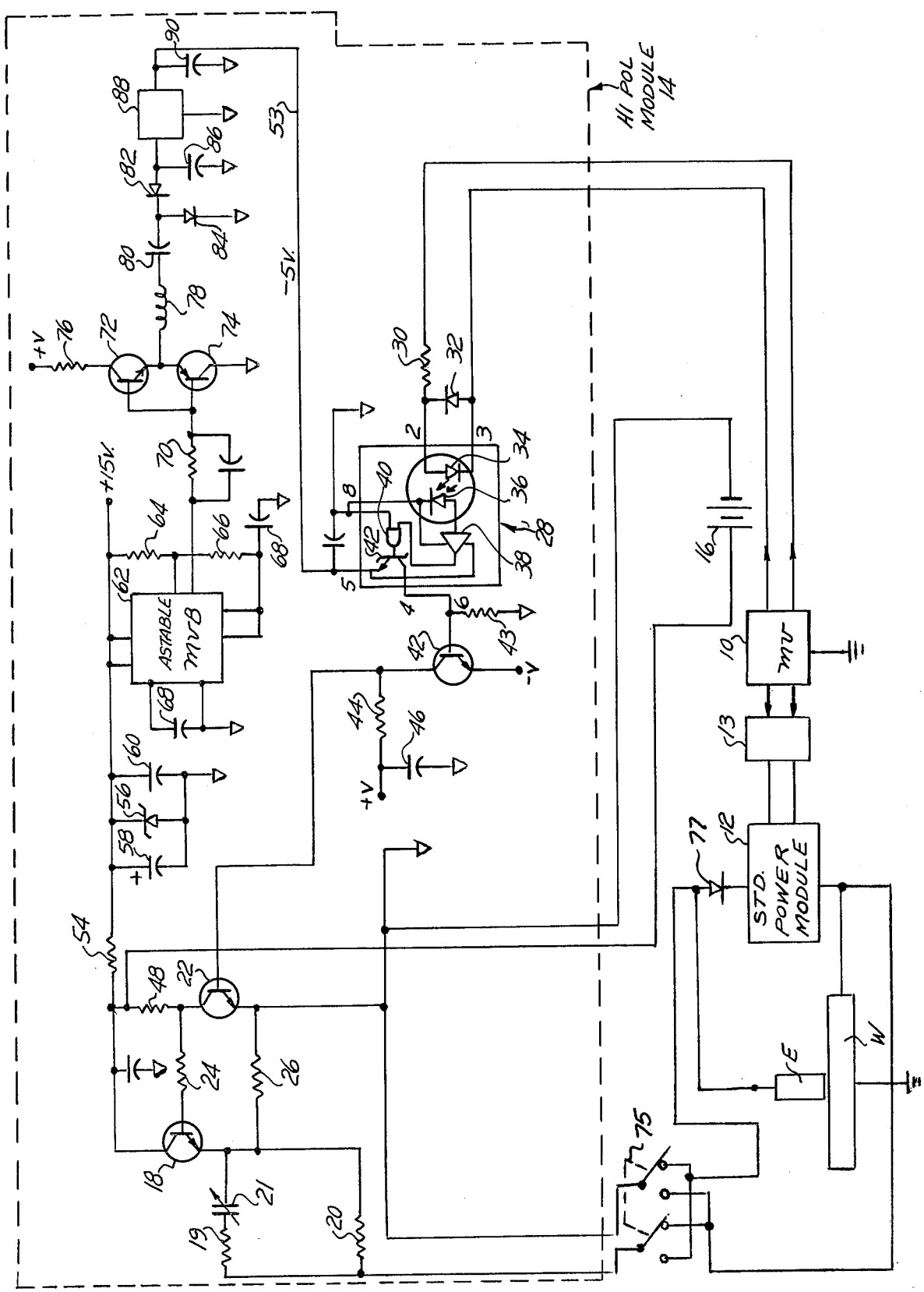

POWER SUPPLY CIRCUIT OF THE HIGH VOLTAGE TYPE FOR ELECTRICAL DISCHARGE MACHINING APPARATUS

BACKGROUND OF THE INVENTION

The field to which this invention is applicable is that of electrical discharge machining, sometimes hereinafter referred to as "EDM" in which process material is removed from an electrically conductive workpiece by erosive electrical discharges passed across a dielectric filled gap from a tool electrode. The process is precisely controlled, usually by the use of an independent pulse generator and one or more electronic output switches in an output module. The output module switches are periodically turned on and off at a preset frequency to connect and disconnect a DC power supply from the gap thus to provide machining power pulses. In some types of machining operations, it is desirable to use a higher cutting voltage than that of a standard power module. In standard EDM operations, the power supply voltage may be of the level of 70-80 volts. When high voltage or hi pol machining is used, the voltage level is raised to as high as 180 or 200 volts particularly for finishing operations. It is important that the power supply have the capability of being operated in either mode for both roughing and finishing operations.

SUMMARY OF THE PRESENT INVENTION

This invention provides a high voltage output module for EDM which is of the opticoupled and high voltage type. The entire high voltage module is floating and imposed on top of a standard power module. The module and its DC supply are all electrically isolated from the gap. The only gap connection is through the work leads so the module can be turned for either plus or minus output or split output.

BRIEF DESCRIPTION OF THE DRAWINGS

The present invention will be described in detail in the accompanying specification and drawing in which like reference numerals are used to refer to like parts. The drawing is of the combined block and schematic type.

DETAILED DESCRIPTION OF THE PREFERRED EMBODIMENT

Reference is made to the drawing for its showing of a basic EDM power supply that includes an independent pulse generator such as multivibrator 10. The multivibrator 10 provides triggering pulses through intermediate amplifier stages 13 as required. The triggering pulses are used to trigger into machining operation either or both of a standard power module 12 or hi-pol module 14. The standard power module 12 includes output electronic switches and a DC source. At lower machining voltage levels such as, for example, 70 or 80 volts, the initial roughing stages of the EDM operation are carried on across the machining gap which includes electrode E and workpiece W.

Reference is now made to the high voltage module 14 which includes a DC source 16 of the order of 200 volts or more. The DC source 16 is periodically connected and disconnected from the gap by the operation of an electronic output switch transistor 18. The transistor 18 has its principal electrodes operatively connected to the positive gap terminal at workpiece W through a current limiting resistor 20. The transistor 18 has connected to it a drive stage comprising drive transistor 22 which has its collector connected to the base of the transistor 18 through a resistor 24 in Darlington configuration. A further resistor 26 is connected between the emitters of the two transistors 18, 22 as shown.

Also shown in the drawing are the additional stages required to provide machining power pulses to gap from the transistor 18. These include an opti-coupling network 28 that has as its input a series resistor 30 and a diode 32 connected as shown.

Also included in the output of the transistor 18 is a further series resistor 19 and a relay actuated contact 21 which may be closed where desired to add additional series resistance in the output of the transistor 18 thus to limit the magnitude of gap current.

The opti-coupling network 28 will be seen to include an opticoupler of the integrated circuit type having a light emitting diode 34 between input pins 2 and 3 and an amplifier 38 and a gate 40 coupled between pins 7, 8, 5 and 4 as shown. When the diode 34 is energized by passing a current through it, i.e. a machining power pulse from the multivibrator 10, a light is transmitted internally to a photo-diode 36. The output of the photo-diode 36 is amplified by amplifier 38 and the gate 40 is used to turn on the next following output transistor 42. The opti-coupler stage 28 operates as relatively fast acting device by reason of the inclusion of the amplifier 38 and the gate 40.

The output pin 6 from the opticoupler stage 28 provides a signal to the base of the transistor 42. A suitable resistor 43 is connected between pin 6 and ground.

The collector output from the transistor 42 is connected to ground and to a plus voltage source through a resistor 44 and a capacitor 46. The signal from the collector of the transistor 42 is then passed to the base of the first Darlington transistor 22 where the signal is inverted and applied to the base of transistor 18 for turn-on. The output Darlington transistor 18 has its emitter connected as already indicated through one or more output resistors 19, 20 so that suitable current limiting can be provided through the operation of one or more relays 21. It will be seen that the collector of the transistor 22 is connected to the terminal of the DC source 16 through a resistor 48.

It is necessary to develop a negative voltage signal through lead 53 as shown to provide fast turnoff. The upper portion of the drawing shows a network for developing this signal and applying it as an input to pin 5 of the opticoupling stage 28. The input to the lefthand terminal of the network is through a series resistor 54. The voltage is clamped to a 15 volt level through a zener diode 56 and associated capacitors 58, 60. The signal is then passed as an input to an astable multivibrator of the integrated circuit type 62. External resistors 64, 66 and capacitors 68 to ground are coupled as shown. The output from the astable multivibrator 62 is passed through a signal RC network 70 to the bases of a next following push-pull stage including transistors 72 and 74. Operating voltage for the push-pull stage is provided from a positive voltage source and a resistor 76 connected in series with the collector of the transistor 72.

A relatively small magnitude choke 78 is included in the circuit to provide necessary impedance. Capacitor 80 is connected to the next following fileter and retification stage including diodes 82, 84 and a capacitor 86. The negative voltage signal is then passed through a voltage regulator 88 and thence through the lead 53 as an input to the opticoupling stage 28. An additional capacitor 90 is connected to ground as shown.

It will be seen that the high voltage module 14 provides an improved high voltage machining EDM operation at high frequencies with effective turn-on and turn-off characteristics. Isolation of the DC source from the gap is complete except where it is connected through work leads. A polarity reversing switch 75 is connected in the gap circuit as shown. In standard polarity, the electrode is negative relative to the workpiece. In reverse polarity, the electrode is positive relative to the workpiece. The condition of standard polarity is illustrated in the drawing. A blocking diode 77 is included between the high voltage lead and the standard power module.

We claim:

1. A high voltage machining power module for an electrical discharge machining power supply including a pulse generator having a triggering pulse output, comprising; a relatively large magnitude power source; an output electronic switch having its principal electrodes operably connected between said source and the gap for providing high voltage machining power pulses thereto; and an opticoupling stage connected intermediate said output of the pulse generator and said output switch for operating it to provide machining power pulses to the gap, said opticoupling stage including an input light emitting diode and an output photo diode, and a fast turn-on network for said output electronic switch connected in the circuit of said photo diode comprising in series an amplifier, a gate and a transistor connected intermediate said photo diode and said output electronic switch.

2. The combination as set forth in claim 1 wherein a network is further included for providing a fast turn-off signal for said opticoupling stage comprising an astable multivibrator, a push-pull drive stage and a voltage regulator, said astable multivibrator coupled to said output transistor for initiating said turn-off signal.

3. A high voltage machining power module for an electrical discharge machining power supply including a pulse generator having a triggering pulse output, said module comprising a DC power source of the order of 200 volts; a pair of output electronic switches having their principal electrodes operably connected between said source and the gap for providing high voltage machining power pulses thereto, said switches comprising a pair of transistors coupled in Darlington configuration one to the other, and an opticoupling stage including an input light emitting diode and an output photo diode, connected intermediate said output of the pulse generator and said output electronic switches for operating them to provide machining power pulses to the gap, said opticoupling output photo diode including a diode and an amplifier operatively associated therewith for increasing the rate of operation of such opticoupling stage and thus providing faster turn-on of said electronic switches.

4. The combination as set forth in claim 3 wherein a fast turnoff network is further included for providing a turnoff signal for said opticoupling stage, said turn-off network operably connected to said output electronic switches and including an astable multivibrator, a push-pull drive stage and a voltage regulator for interrupting the operation of said photo diode.

5. A high voltage machining module for an electrical discharge machining power supply including a pulse generator having a triggering pulse output, said high voltage module comprising: a DC power source of the order of 200 volts; a pair of output transistors, the first of said pair having its principal electrodes operably connected between the source and the gap for providing high voltage machining power pulses thereto, the second of said pair connected to the first in a Darlington configuration; an opticoupling stage connected intermediate the output of said pulse generator and the base of said second transistor for operating the pair thus to provide power machining pulses to the gap, said opticoupling stage including an input light emitting diode and an output photo diode; said output photo diode including in its output a series connected amplifier, a gate and a drive transistor for providing fast turn-on of said second transistor; and a fast turn-off network connected between said second transistor and said drive transistor for accelerating turn-off of the opticoupling stage.

* * * * *